United States Patent [19]

Senanayake

[11] Patent Number: 5,053,608

[45] Date of Patent: Oct. 1, 1991

[54] PERSONAL IDENTIFICATION SYSTEM

[76] Inventor: Daya R. Senanayake, 9 Ecrin Place, Colombo 8, Sri Lanka

[21] Appl. No.: 469,449

[22] PCT Filed: Aug. 16, 1988

[86] PCT No.: PCT/LK88/00002

§ 371 Date: Jun. 4, 1990

§ 102(e) Date: Jun. 4, 1990

[87] PCT Pub. No.: WO89/03100

PCT Pub. Date: Apr. 6, 1989

[30] Foreign Application Priority Data

Oct. 2, 1987 [LK] Sri Lanka .................................. 9806

[51] Int. Cl.[5] .............................................. G06K 5/00

[52] U.S. Cl. .................................. 235/380; 235/382; 235/492; 340/825.340

[58] Field of Search ............ 235/379, 380, 382, 382.5, 235/487, 492; 382/2-5; 340/825.3, 825.31, 825.34

[56] References Cited

U.S. PATENT DOCUMENTS 3,383,657 5/1968 Claasen et al. ................. 235/380 X
3,576,537 4/1971 Ernst .................................. 235/380
3,576,538 4/1971 Miller ................................. 235/380
3,581,282 5/1971 Altman ........................... 235/380 X
3,614,737 10/1971 Sadowsky .............................. 382/2
4,140,272 2/1979 Atalla ................................. 235/380
4,532,508 7/1985 Ruell .................................. 382/4 X
4,582,985 4/1986 Löfberg .............................. 235/380
4,636,622 1/1987 Clark .................................. 235/380
4,669,487 6/1987 Frieling ............................. 382/2 X

*Primary Examiner*—Stuart S. Levy
*Assistant Examiner*—Steven M. duBois
*Attorney, Agent, or Firm*—Horst M. Kasper

[57] ABSTRACT

A personal identification system wherein an encoded version of the user's fingerprint is reprint is recorded on an identification card or device; this encoded version is security machine-read and directly compared at the time of use with an impression of the fingerprint on a different but designated area of the card, or alternatively on a designated area of the machine-reader or a separate card, the comparison being done on a one-to-one basis so as to reduce the need for a large memory or storage capacity for fingerprint records on the card or in the security machine-reader. The personal identification system can be used with passports, travellers cheques, credit cards, cheque cards and the like.

10 Claims, 1 Drawing Sheet

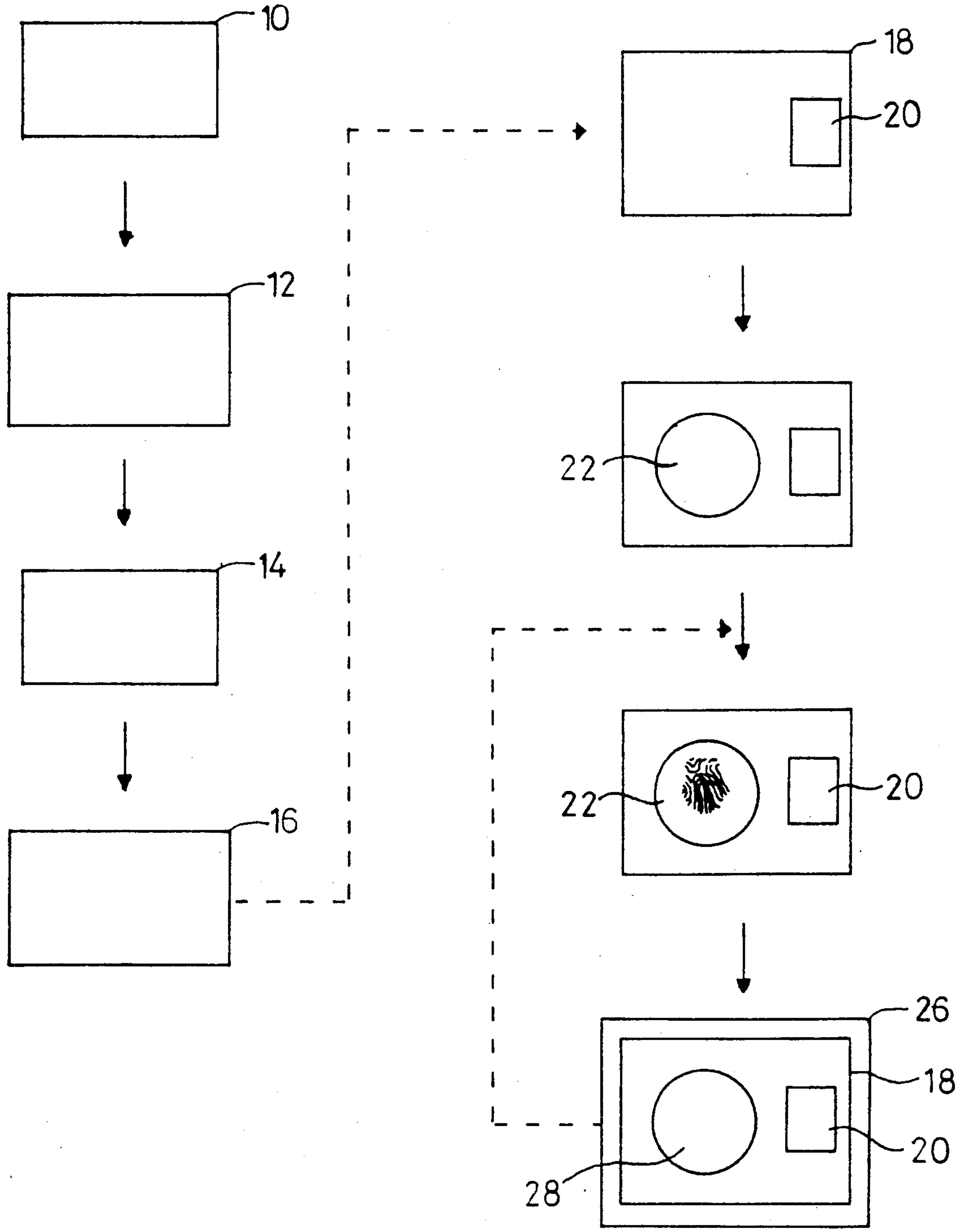
10
12
14
16
18
20
22
22
20
26
18
20
28

PERSONAL IDENTIFICATION SYSTEM

BACKGROUND OF THE INVENTION

1. Field of the Invention

This invention relates to a personal identification system, and to a corresponding method of personal identification.

2. Brief Description of the Background of the Invention Including Prior Art

There are many occasions on which a person's identity needs to be reliably confirmed to someone to whom they are not known. Thus members of the armed forces, and civilians having access to security areas, are often required to carry security cards, and to have their fingerprints recorded. Persons requesting personal credit are often issued with a credit card containing a numerical code, or with a picture of the authorised user securely affixed to the card. A cheque guarantee card will usually have recorded thereon the authorised user's signature, which can be electronically compared (by a computer based system) with a signature written on a cheque.

The disadvantages of relying solely upon a security card or pass (including cheque guarantee cards) or upon a standard credit card have long been recognised; photographs can be replaced, signatures can be forged, the card or pass can be stolen, a password or other identifier can inadvertently be revealed.

There has therefore been proposed a personal identification system comprising a card and a machine-reader, the card having both a first area with a permanent record of a singularity individual to the authorised user of the card and a designated card and a machine-reader, the card having a first area with a permanent record of a singularity individual to the authorised user of the card characterised by a designated second area adapted temporarily to record that singularity, the permanent and temporary records being in a form permitting direct comparison by the machine-reader.

We also propose a personal identification system comprising a card having a first area with a permanent record of a singularlity individual to the authorised user of the card characterised by a designated second area of the card adapted temporarily to record that singularity, the permanent and temporary records being at positions on the card and in a form permitting direct comparison. Preferably the card will be machine-readable, for an automatic and direct comparison of the permanent and temporary records, and in such case the permanent and temporary records need not be in visible form, so that if the card is stolen, the thief may not know which singularity to seek to counterfeit.

We further propose a method of personal identification characterised by issuing a card having a permanent record of a singularity peculiar to a person authorised to use the card, requiring the person to provide a temporary record of that singularity each time the card is used, machine-reading the permanent and temporary records, and obtaining a match or non-match indication from the machine-reader. second area adapted temporarily to record that singularity, the permanent and temporary records being in a form permitting direct comparison by the machine-reader.

One personal identification system of this type is disclosed in U.S. Pat. No. 4,582,985 and in British Patent Application 2185937A. The credit or similar card incorporates a computer-produced image of a thumb or fingerprint of the authorised holder, and includes also a fingerprint reader, a processor for print matching and an indicator such as a liquid crystal display. When a transaction is to be verified, a finger or thumb is applied to the reader, operating a pressure sensitive switch which causes the print to be compared with that held in the card. If there is a satisfactory match this causes for instance the holder's account number or personal identification number to be displayed on the indicator on the card.

A disadvantage of the personal identification system described in the preceding paragraph is that a reliable reader capable of accurately distinguishing between fingerprints cannot easily be located within the thickness of a card. Another disadvantage is that the card carries its own indicator, which is a help to anyone intending to use the card fraudulently in their (private) experiments to achieve a suitable counterfeit fingerprint.

Another personal identification system has been proposed using however a machine-reader or processor separate from the card.

Such an arrangement is disclosed in U.S. Pat. No. 3,383,657; the second designated area is on the machine-reader. Although avoiding the disadvantages mentioned in the preceding paragraph, a determined third party can still defeat a security check, as by using an impression of the authorised user's fingerprint.

SUMMARY OF THE INVENTION

Purpose of the Invention

It is an object of my invention to provide a personal identification system and a method of personal identification which seeks to overcome or reduce the above problems.

Brief Description of the Invention

According to one feature of my invention I provide a personal identification system comprising a card and a separate machine-reader, a first area with a permanent record of a singularity individual to the authorised user of the card, the card having said first area, a designated second area adapted to record that singularity for a temporary period, the permanent and temporary period records being in a form permitting interrogation and comparison by the machine-reader, comparison means associated with said machine-reader for comparing said permanent and temporary period records, and indicator means coupled to said comparison means for acting on comparison of said records characterised in that one of said card and machine-reader includes a plurality of designated second areas and in that said machine-reader is programmed not to indicate a favourable comparison from at least one but not all of said designated second areas. This arrangement has the advantage that a positive match is not indicated if the singularity individual to the authorised user of the card or a counterfeit thereof is recorded at said at least one of the designated second areas, with therefore an additional security provision.

According to another feature of my invention I provide a method of personal identification which includes issuing a card having a permanent record of a singularity peculiar to a person authorised to use the card, requiring the person to provide a temporary record of that singularity each time the card is used, machine-reading the permanent and temporary records, and obtaining a match or non-match indication from the machine-reader characterised by providing a plurality of designated second areas on one of the card and machine-reader, each of said designated second areas being adapted to store the record for a temporary period at least sufficient to permit said comparison, and programming the machine-reader not to indicate a match indication from a record at at least one but not all of said designated second areas.

It will be understood that the permanent and temporary records need not be in visible form, so that if the card is stolen the thief may not know which singularity to seek to counterfeit.

In this specification "temporary" refers to a time greater than that required from recording the singularity at the second area to the subsequent checking by a machine-reader of the selected singularity against the permanent record of the selected singularity against the permanent record at the first area, but less than that time required between isolated transactions for which the card could be used i.e. to prevent fraudulent misuse of a stolen card at another machine-reader station.

Preferably the singularity will be a fingerprint, though for certain countries and/or applications we forsee that an alternative or additional singularity may be adopted, such as one based on another ridged area of the hand such as the thumb, or even of the foot. As however is well known, finger prints are already widely used as a personal identification, since they reliably establish a person's identity despite, in law enforcement, personal denial, an assumed name or changes in personal appearances resulting from age, decease or accident. However, there are disadvantages: {a} proper comparison of one or more fingerprints against a fingerprint record requires considerable training and experience, and has not therefore been suited to widespread commercial adoption or use; {b} the fingerprint records of individuals are traditionally held in central collections, not easily or quickly accessible; {c} large central record offices are needed, in different countries. It will be understood that fingerprints are conventionally stored on separate record cards and that a properly taken record card needs to be of a size to carry two full sets of the individual's prints; the "rolled" impressions taken in ten numbered blocks are made by rolling each finger completely from edge to edge in its individual block, thus providing the maximum area for classification, whilst the "plain" impressions serve to verify the correct sequence of the rolled prints and may also help in classification if the rolled prints are blurred.

It is also known that single-fingerprint systems are occasionally used in law enforcement checks, but these share many of the above disadvantages as well as requiring specially designed scanning glasses or recticules to measure or locate specific details in the impression being classified.

Whilst I forsee that more than one fingerprint may be compared in my system, it is an advantage of this invention that only a single fingerprint or selected details thereof (such as the position of discontinuties) of any individual needs to be recorded, and that manual classification is not needed. However, a plurality of fingerprints, or a fingerprint together with one or more other singularity e.g. a signature or a code number, can be used at the designated second area (or at a plurality of designated second areas) if desired.

Conveniently the fingerprint will be recorded on paper or photographed in the usual manner; it will then be encoded by an electronic scanning and digitising machine before being permanently applied to or embedded into the first area of the card. The fingerprint record can be encoded in full, or by sample to a pre-determined program, or only unusual changes in the singal are encoded, such as at discontinuities.

Usefully, prior to application to or embedding in the card, random "electronic" deletions or additions can be made to the encoded version, which can be common to all cards; though alternatively the deletions/additions can be individual to a card, there being a code held by the authorised user of that card and keyed into the machine-reader at the times the card is used. Thus the machine-reader will be programmed either to "add in" or "subtract" such deletions/additions generally, or specifically as required for that particular card in response to the keying in of the card number or secret code number, prior to or whilst making the comparison between the permanent record of the first card area and the temporary record of the designated second card area.

The cards will be prepared at a central location, under security conditions, but will in use be machine-read locally at each "checking" station, with direct comparison of the permanent record carried in or on the card with the temporary record made at the time of use, preferably on a designated second area of the card but alternatively on a designated area such as a "screen" on the machine-reader or even on a separate card; if the designated second area is on the card, the machine-reader "checks" both the temporary record and its position, and so effects a "double-check" before indicating matching records. It will be understood that the provision of an electronic scanning and digitising machine (machine-reader) at each security position e.g. a bank counter, passport office, retail outlet etc, will allow rapid confirmation of a person's identity. In the preferred arrangement, the "customer" will press his fingers onto the designated second area (or one or more sections of that second area) of the card or of the machine-reader, in front of and in sight of the security staff, and this recording is then machine-compared with the permanent record of the first area, with a positive or negative indication to the security staff. We forsee that the reading of the temporary record will be by optical reflection, with the reflected light pattern being observed by an image reader of known design for conversion into an electrical signal. The machine-reader can be programmed to effect retention of the card if too few matching similarities are found. Usefully the machine will have an ancilliary arrangement (computer program) whereby the fingerprint impressed onto the said second area will be removed upon withdrawal or ejection of the card from the machine. The machine reader may be programmed to verify the permanent record against any (sequential) part of the temporary record, to limit or avoid the possibility of a negative comparison merely because for instance the finger is applied to the designated second area with a different orientation or "roll" position.

Although we envisage the greatest usefulness of this invention in relation to flexible plastic cards, such as the known credit cards, other "carriers" for the first and second areas can be used, and other materials than plastics.

BRIEF DESCRIPTION OF THE DRAWING

In the accompanying drawing, in which are shown several of the various possible embodiments of the present invention:

FIG. 1 is a schematic view of a personal identification system.

DESCRIPTION OF INVENTION AND PREFERRED EMBODIMENT

The invention will be further described by way of example with reference to the accompanying schematic flow chart.

Upon initial recruitment, for instance to a credit card service, a potential user will be required to have one of his fingerprints recorded, usually the print of the digit finger; though in an alternative embodiment more than one of his fingerprints will be recorded. The recording will be in one of the known ways, for instance using a thin uniform film of black printer's ink spread over a smooth piece of glass or polished metal; the fingers will be placed on the film of ink and then pressed immediately onto a suitable (white) record sheet or card so that the entire pattern of slightly elevated ridges and their detailed arrangement is faithfully reproduced by the ink, which is selected to dry quickly on the contrasting white card.

The white card is then placed under a (fingerprint) scanning device 10, if necessary after being either magnified or reduced in size. One suitable scanning device has the appearance of a know video camera, and performs some of the same functions. Alternatively the scanning device can be of the type which will read a simulated bar-code, and will be arranged either to traverse simultaneously a parallel series of adjacent narrow "strips" across the print or to traverse them sequentially, so that the fingerprint then appears to the scanner as a series of lines, often differently spaced and of different thickness, the "output" being the scan of a number of such strips, and for the sequential scan in end-to-end relation.

After electronic scanning, the resulting analogue record is transformed into a digital record by digitising machine 12 and so is transformed into a sequential series of digital signals.

The digital signal record produced by digitising machine 12 is fed to computer 14 having software whereby the digital record is modified, in this embodiment by the addition of apparently random but repeatable signal insertions, but in an alternative embodiment by deleting apparently randomly selected sections of the digital record.

The output from computer 14 is fed into printer 16 which prints out the encoded version of the original fingerprint onto any suitable medium, in this embodiment paper, but in alternative embodiments magnetic tape or plastic sheets. The commercially-used "soft-strip" system can also be used. The magnetic stripe as used on credit cards has only a limited storage capacity and so would be more conveniently used with a system in which only selected parts of the fingerprint record were selected for matching.

The scanning device 10, digitising device 12, computer 14 and printer 16 can be in a common housing or be parts of a common unit.

The encoded version is embedded in or affixed on the security card 18 at first area 20 which previously was a blank space; though in an alternative version the printer can print directly onto the security card 18. Thus the security card 18 now has the encoded version of the original fingerprint recorded on it at first area 20.

Prior to issuance to a potential user, at a designated position thereon the security card 18 has a second area 22 formed, or in an alternative embodiment coated, so as to be adapted to receive a fingerprint impression. Although in its simplest version, the second area can be a smooth surface adapted to accept an outline of the fingerprint in sweat, oily matter or other substance present on the finger (as is well known e.g. in law enforcement, for the taking of latent prints) usefully the second surface will be impregnated with or carry a developing agent of either the so-called grey powder (for use on dark-coloured and mirror-like surfaces) and commonly containing mercury and chalk or aluminium and chalk; or the so-called black powder of lamp black and a resinous material. Alternatively, the surface may be chemically treated, either generally or at the time of use, suitable chemicals being iodine, silver nitrate and ninhydrin, as used also in law enforcement work; or it may be treated with an emulsion or carry a magnetic tape or a pressure sensitive tape, selected so that it will hole the impression of the fingerprint temporarily or until wiped off.

In an alternative embodiment the designated second area can be located on the machine-reader, or even on a second card.

In use, the carrier of the card will be asked to press his finger onto the designated second area 22 of the card at the time of use, in sight of the security staff, to form either a "plain" or a "rolled" print as specified by the card authorities. The card will then be fed by security staff into an adjacent machine-reader comprising a combined scanner/digital reader/computer 26 which {a} scans second area 22 {b} converts the image received from the second area 22 into a digital version; and {c} compares this digital version with the digital input received from first area 20 (using either a standard pre-set formula within the computer software or by a direct reading with an included version of the original fingerprint recorded on the card).

In an alternative embodiment, primarily for a "rolled" fingerprint, the beginning and end of the direct reading, or alternatively the side edges of the first and second areas are ignored, to avoid rejection of the card simply because the finger when pressed against the second designated area 22 is not at exactly the orientation as was used for the record at the first area 20.

After use, the card is withdrawn from the machine, and in so doing the second area 22 is wiped clean, as schematically indicated at 28, to prevent unauthorised use if the card is lost.

Whilst we strongly prefer the use of fingerprints, since scientific study has shown that fingerprints afford an infallible means of personal identification, in an alternative embodiment another singularity can be used.

In a preferred modification, each card issued is given an individual serial number and a secret code number held only by the owner and for use when inserting the card into the security machine-reader. Thus prior to inserting the card, the owner keys in his personal code number, and the machine then automatically adds to or subtracts from the scanned image from second area 22 (or the coded version derived therefrom), it being this modified record which is compared with a similarly-modified record embedded in first area 20.

For yet additional security, in one alternative embodiment the designated second area 22 is not at the same designated position on the card for all the cards issued, and in another alternative embodiment the designated second area is divided into a group of squares (or other shapes), an authorised user at the time of issue of a card being told which "square" to use as the designated second area 22. For such card embodiments, the security machine-reader can have abort circuitry energised upon attempted mis-use of a card, for instance whereby the encoded version at first area 20 is "wiped clean" if for example three attempts are made to use the card by impressing the finger on an incorrect or non-designated second area 22, such as a non-designated "square"; such abort circuitry would normally only be used if the card required a code to be keyed in at the time of use, to limit inadvertent activation. Alternatively or additionally, the card itself can be fitted with an inbuilt deletion system which can erase or jumble the digitally encoded first-area print if an unauthorised attempt is made to decode and/or to reprint the original fingerprint record from area 20. For high-security use, the designated second area can be divided into e.g. seven separate areas, with the machine-reader programmed to interrogate only one of the areas, with a different area nominated each day in a sequence disclosed in advance only to authorised personnel.

An advantage of our proposal is that the known security and infallibility of fingerprint records can be used commercially, without the need for security staff to access a central library of fingerprints, without the delay consequent thereon and/or the need to employ skilled fingerprint-reading staff. As the scanner/digitiser/computer or machine-reader has only to compare each fingerprint at a second area 22 against the "master" print, which is recorded on the card at first area 20, the computer or machine-reader requires relatively little memory capacity; each scanner/digitiser/computer or machine-reader is therefore capable of handling a large number of cards and so is suited to use at a checking position with heavy traffic e.g. retail pay-desk/passport checkout/bank counter. Because the original fingerprint record is encoded prior to being positioned at first area 20, the record is difficult to copy and counterfeit, particularly since in the preferred encoded example the fingerprint record is not made visible. Whilst the security machine-reader scans the fingerprint record from both first area 20 and from the pre-selected and designated second area 22 in accordance with preset formula, this formula can be changed from time to time, and this can provide additional security in that different formulae may be written to give a different notational value to selected ones of the various pattern shapes or types e.g. the arch, tented arch, radial loop, ulnar loop and whirl, present in some or all fingerprints. Because the card is only issued after the permanent record has been made, loss of a card during transit to the intended user cannot result in someone else for instance signing the card.

I claim:

1. A personal identification system comprising a card having a first recording means for permanently storing a first singularity which is unique to the authorized user of the card;

a card reader;

a second recording means located on either the card or the card reader for temporarily recording a second singularity; wherein said card reader further includes comparison means for comparing said first and second singularities and indicator means for indicating either a positive or negative result of said comparison means;

wherein said second recording means further comprises a plurality of recording areas, each of said recording areas capable of temporarily recording said second singularity upon presentation thereof, and said indicator means will not indicate a positive result from at least one but not all of said recording areas.

2. The personal identification system according to claim 1, wherein said second recording means is located on said card.

3. The personal identification system according to claim 1, wherein the card reader includes means for interrogating only one of the recording areas and wherein the interrogated recording area is selected in accordance with a predetermined sequence.

4. The personal identification system according to claim 1, wherein the first recording means has a permanent record of the first singularity in a form non-readable to the human eye.

5. The personal identification system according to claim 4, wherein said first and second recording means store said first and second singularities as digitally encoded records, whereby said first and second singularities are machine-readable.

6. The personal identification system according to claim 5, wherein the digitally encoded record stored on the card includes modifications individual to the card and predetermined by the provider of the card and wherein the card reader includes means for injecting corresponding modifications into the record derived from the designated second singularity in response to a security code entered into the card reader.

7. The personal identification system according to claim 1, including means for erasing said temporary recording of said second singularity upon removal of the card from the card reader.

8. The personal identification system according to claim 1, wherein the card is made of a synthetic, resinous plastic material and said first recording means comprises a strip of magnetic tape.

9. The personal identification system according to claim 1, wherein the first singularity is a fingerprint.

10. A method of personal identification comprising the steps of:

(a) issuing a card having a permanent record of a first singularity unique to an authorized user of said card, (b) providing a plurality of recording areas on said card, each of said recording areas capable of temporarily recording the singularity of the user of said card, (c) requiring the user to record the singularity on one of said recording means, (d) reading both said first singularity and said user's singularity by means of a card reader, (e) comparing said first singularity with said user's singularity, (f) determining whether said one recording area corresponds to the recording area designated according to a sequence stored in said card, and;

(g) indicating a positive identification only if both steps (e) and (f) result in a positive comparison and determination, respectively.

* * * * *